(12) United States Patent
Ernst

(10) Patent No.: US 6,356,291 B1
(45) Date of Patent: *Mar. 12, 2002

(54) METHOD AND APPARATUS FOR PROVIDING PRINT QUALITY ENHANCEMENT

(75) Inventor: Larry Mason Ernst, Longmont, CO (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,206

(22) Filed: Nov. 6, 1998

(51) Int. Cl.$^7$ .................................................. B41J 2/47
(52) U.S. Cl. ..................................................... 347/251
(58) Field of Search ........................ 347/135, 43, 251, 347/119, 131, 132

(56) References Cited

U.S. PATENT DOCUMENTS

| | | | | |
|---|---|---|---|---|
| 4,414,583 A | * | 11/1983 | Hooker, III | 347/135 |
| 4,816,863 A | | 3/1989 | Lee | 355/14 |
| 5,111,302 A | * | 5/1992 | Chan et al. | 346/140 |
| 5,134,495 A | | 7/1992 | Frazier et al. | 358/298 |
| 5,252,995 A | * | 10/1993 | Trask et al. | 347/119 |
| 5,500,662 A | * | 3/1996 | Watanabe | 346/140 |
| 5,717,448 A | * | 2/1998 | Inada | 347/43 |
| 5,724,090 A | * | 3/1998 | Tanaka et al. | 347/251 |
| 5,751,470 A | | 5/1998 | Damon | 358/298 |

OTHER PUBLICATIONS

Hewlett Packard, "White Paper Innovations In Print Quality Technology", Feb. 10, 1998, pp1–4.
M.J. Stanich, "Print–Quality Enhancement In Electrophotographic Printers", IBM J. Res. Develop. vol. 41 No. 6, Nov. 1997, pp. 669–678.

* cited by examiner

Primary Examiner—N. Le
Assistant Examiner—K. Feggins
(74) Attorney, Agent, or Firm—Blakely, Sokoloff, Taylor & Zafman LLP

(57) ABSTRACT

A printing device including a first unit to receive data representing a first center pel and a set of neighboring pels. The printing device includes a second unit that compares the first center pel, the set of neighboring pels to a set of pel patterns. In one embodiment of the invention, the pel patterns only have a center pel of a first color selected from at least two separate colors. In one embodiment, the pel patterns only have a black colored pels as the center pels. In response to a match between the first center pel, the set of neighboring pels, and a pel pattern, a printing size of the first center pel is modulated. In addition, in one embodiment of the present invention, each pel pattern has a corresponding laser power level.

24 Claims, 2 Drawing Sheets

METHOD AND APPARATUS FOR PROVIDING PRINT QUALITY ENHANCEMENT

FIELD OF THE INVENTION

The present invention relates to enhancing the quality of printing images.

BACKGROUND OF THE INVENTION

In the field of printing technologies, there is a continuing need to provide the ability to generate the appearance of high-resolution printing on printers with lower resolution than would otherwise be required. For example, antialiasing is a common technique used to provide the appearance of high-resolution printing.

In particular, with antialiasing, the appearance of text and graphics is improved by smoothing the "steps" that would otherwise appear as jagged edges in the diagonal lines of the text and images. More specifically, printed text and images are made up of thousands of tiny dots (picture elements), which when joined together create images and/or text. With antialiasing, the picture elements (pels) that would otherwise look like a step along the edge of a diagonal line, are printed at partial exposure levels in order to smooth out the step.

An additional technique for smoothing the steps of a diagonal line involves changing the actual color of white pixels that are adjacent to black pixels along the edge of a diagonal line. Specifically, the data representing the color of the white pixels is changed to alter the color of the white pixel to become more of a gray color. Therefore, a blended, smooth appearance between black pixels along a diagonal edge is generated.

The techniques of antialiasing and altering the color of white colored pels however, is typically more beneficial for text rather than images because while text typically relies on the outline of the characters, images rely on areas of gray to show shape, texture and shadow. As a result, if the actual color of white pels are altered to generate smooth outlines, areas of the printed image may become distorted from their binary representations.

In addition, as printing technologies continue to evolve, more dots per inch (dpi) are printed. By printing more dots per inch, the quality of printing may be improved. However, new problems are also presented by the dpi. For example, in conventional printers, black pels are typically printed more bold than their intended size (i.e., they are printed larger compared to their binary representations). As a result, areas of a printed image may appear darker than the true image as represented by the bit map. Moreover, with the increased dpi the over boldness of the black pels is very apparent, especially in images, which rely heavily on specific areas of grey to show shape, texture and shadows.

Therefore, a need exist in the prior art to provide an improved technique for controlling the over boldness of printed images.

SUMMARY OF THE INVENTION

The present invention provides a printing device that includes a first unit to receive data representing a first center pel and a set of neighboring pels. The printing device further includes a second unit that compares the first center pel and the set of neighboring pels to a set of pel patterns. In one embodiment of the invention, the pel patterns only have a center pel of a first color selected from at least two separate colors. In one embodiment, the pel patterns only have black colored pels as the center pels. In response to a match between the first center pel, the set of neighboring pels, and a pel pattern, a printing size of the first center pel is modulated. In addition, in one embodiment of the present invention, each pel pattern has a corresponding laser power level.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention provides a method and apparatus for enhancing the appearance of printed images and text. In one embodiment of the present invention, the quality of printing images and text is enhanced by more accurately printing the pels with respect to their corresponding binary representations. Specifically, the improvement is achieved by reducing the over boldness (e.g., the size) of individual printed pels in order to print pels that more closely resemble the binary representation of the pels. Moreover, considering that the over boldness effect is typically the result of printing black pels too large, one embodiment of the present invention, is limited to reducing the print size of black pels only, and does not alter the printing size of white pels.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
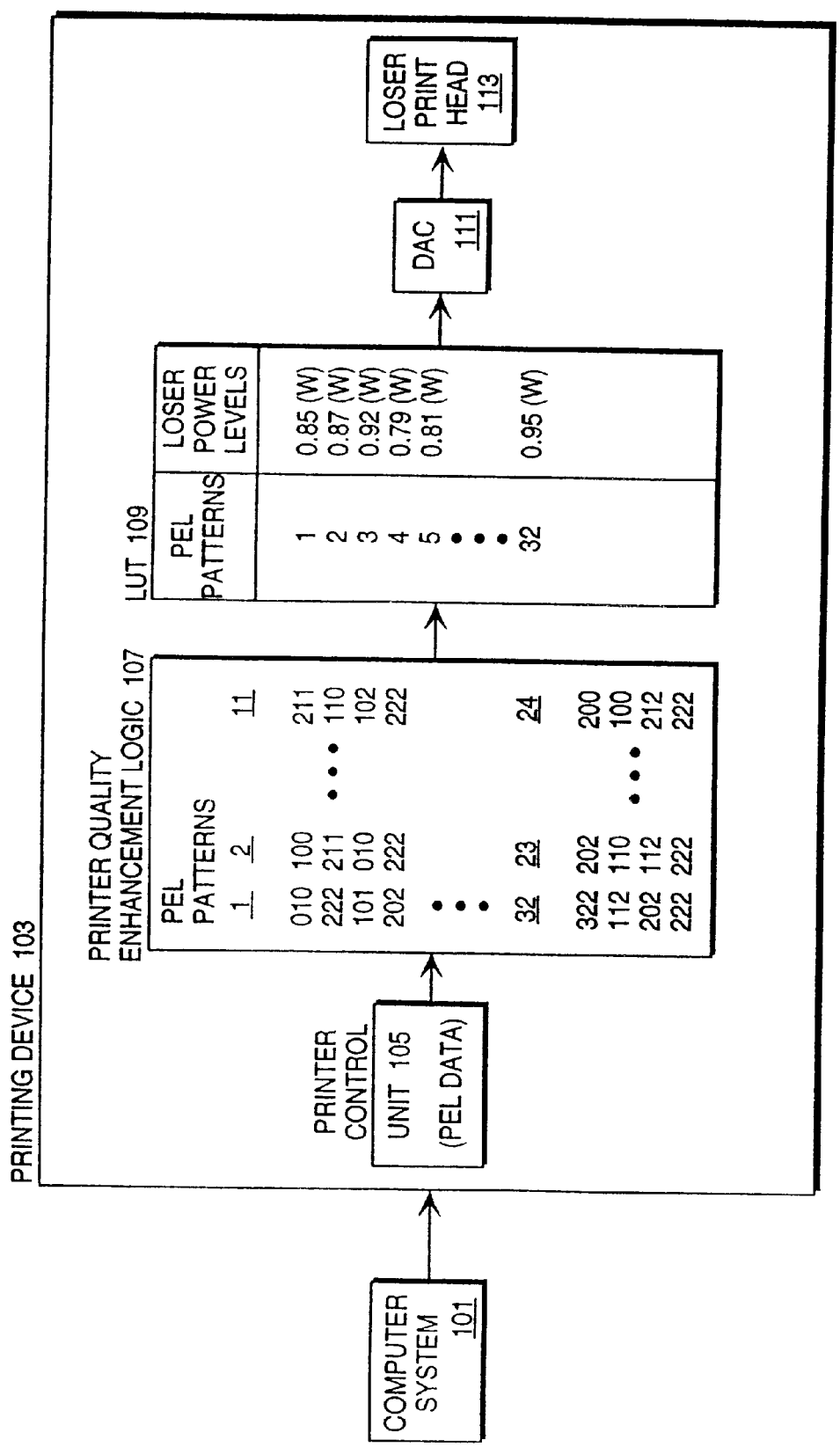
FIG. 1 illustrates a computer system interconnected to a printing device implementing one embodiment of the present invention.

FIG. 1 illustrates a printing device 103 in connection with a computer system 101. As illustrated in FIG. 1, the printing device is configured to modulate the print size of selected pels in an image and/or text in order to more accurately represent the binary representation of the respective image and/or text.

In one embodiment, as illustrated in FIG. 1, the printing device 103 utilizes electrophotographic techniques to print images and text. In alternative embodiments, the techniques according to the present invention may be implemented on printing devices utilizing alternative printing techniques, without departing from the scope of the invention.

Figure 2:
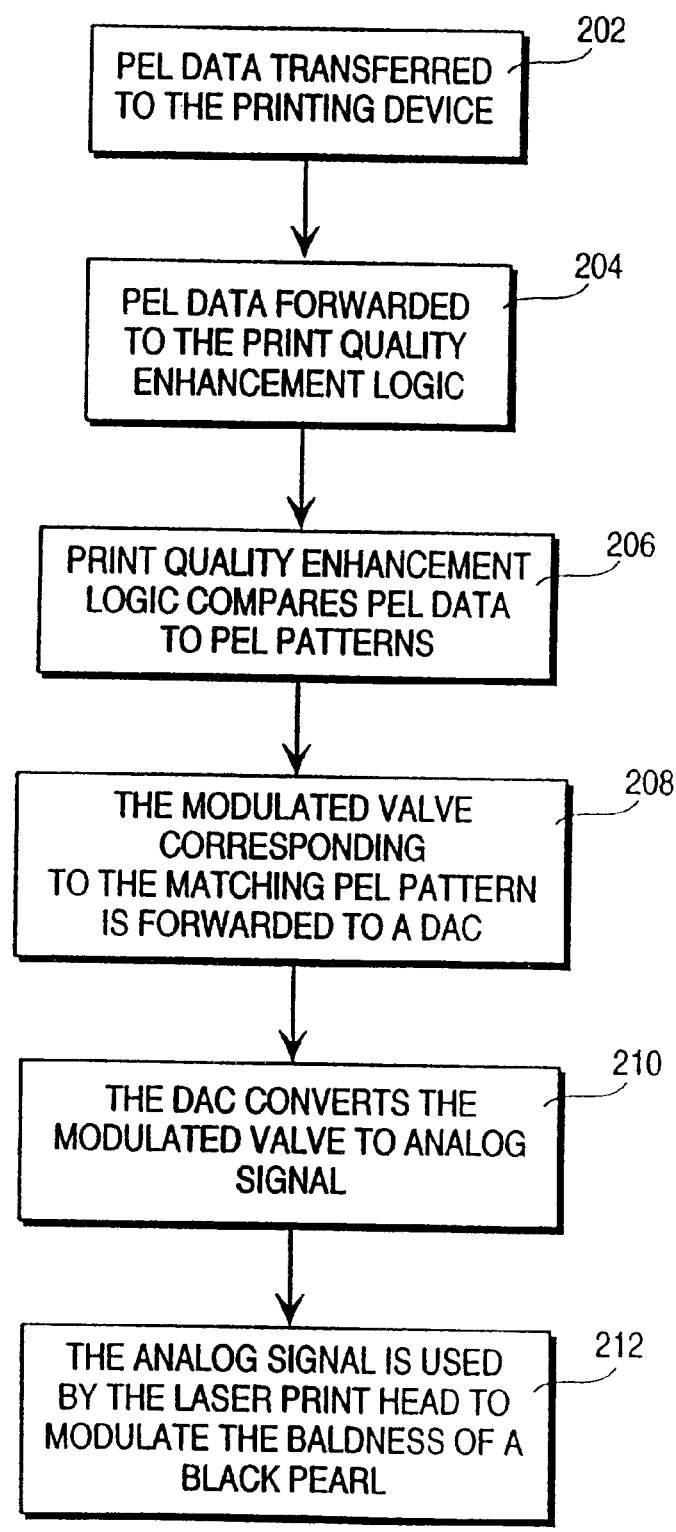
FIG. 2 illustrates a flow diagram describing the steps of the present invention according to one embodiment.

FIG. 2 is a flow diagram describing the steps performed by the computer system 101 and the printing device 103 to provide greater accuracy in printing pels, in accordance with one embodiment of the present invention. The steps of the flow diagram of FIG. 2 are described with reference to the features illustrated in FIG. 1.

Initially, in step 202 of the present invention, a binary representation of an image or text to be printed (hereinafter referred to as Pel data) is generated at the computer system 101 and transferred to the printing device 103.

The pel data, in one embodiment of the present invention, is received at a printer control unit 105 of the printing device 103. The printer control unit 105 may provide a buffer to hold the pel data and pass the pel data along to other units in the printing device as the processing and printing of previously received pel data is completed.

In step 204, the printer control unit 105 forwards the pel data to the Printer Quality Enhancement Logic 107. The Print Quality Enhancement Logic (PQE) 107, in conjunction with the Look Up Table 109, determines a modulated value for individual pels that are to be printed. The modulated value is used by the laser print head 113 to more accurately print a pel size with respect to the binary representation of the respective pel.

More specifically, in one embodiment, the printer control unit 105 transfers to the PQE Logic 107, pel data for an individual pel (i.e., a center pel) and pel data for a set of pels adjacent to the center pel (i.e., neighboring pels). Upon receipt of the pel data, in step 206 of the present invention, the Print Quality Enhancement Logic 107 compares the pel data for the center pel and the neighboring pels with a set of pel patterns stored at the PQE Logic 107. In alternative embodiments, additional pixels in close proximity to the center pixel may also be compared with the set of pel patterns stored at the PQE Logic 107.

Each of the pel patterns provided at the Print Quality Enhancement Logic 107 have a corresponding modulated value, which may be accessed from the LUT 109. In step 208, in response to the Print Quality Enhancement Logic 107 finding a match between the pel data and one of the pel patterns, the modulated value corresponding to the matching pel pattern is provided to the Laser print head 113 to adjust/vary the printing size of the center pels. For example, in one embodiment, the modulated values corresponding to the pel patterns may represent varying power levels that are sent to the laser print head 113 to vary the power of the laser, and therefore vary the print size of a center pel. In addition to more accurately printing the size of a center pels, the technique of the present invention for controlling the over boldness also conserves printing toner.

As illustrated in the pel patterns shown in the PQE Logic 107 of FIG. 1, a "1" denotes a black colored pel, a "2" denotes a white colored pel, and a "3" denotes either a white or black colored pel (i.e., a don't care condition). In alternative embodiments, more or less than thirty-two pel patterns may be provided by the PQE Logic 107 for comparison, and the connotations of the numbers within the pel patterns may vary without departing from the scope of the invention.

In addition, in one embodiment of the present invention, the Print Quality Enhancement Logic 107 provides patterns to match only one color of center pels. For example, one embodiment of the present invention, may only modulate the printing size of center pels that are colored black.

As a result, if a center pel is a white pel, there will be no matching pattern. Therefore, the printing size of a center pel that is white will not be adjusted.

In alternative embodiments of the present invention, however, the PQE Logic 107 may only provide pel patterns for white colored center pels, in place of providing pel patterns for black colored center pels. For example, in the case of a reverse printing engine that prints white pixels (e.g. operating in a copier mode), the printing size of white colored center pixels may be.

The embodiment of the present invention which only modulates the print size of center pels having a black color, takes advantage of black pels typically causing the problem of overboldness. Moreover, by providing pel patterns in the PQE Logic 107 for only one color of center pels, less pel patterns are required, which results in less storage/circuit space being consumed by the PQE Logic 107.

In step 208, in response to the PQE Logic 107 finding a matching pel pattern, the modulated value corresponding to the matching pel pattern may be forwarded to a Digital-Analog Converter (DAC) 111. In step 210, the DAC 111 converts the binary representation of the modulated value to an analog signal that is sent to the Laser print head 113.

In step 212, the analog signal received by the Laser print head 113 may be used to alter the size of the printed pels. The Laser print head 113 may use the modulated value embodied in the analog signal to vary the size of the printed pel via one of at least two techniques. One technique is referred to as Amplitude modulation, wherein the power of the laser beam used to print the pel is reduced. A second technique is referred to as pulse-width modulation, wherein the period of time that the laser beam is exposed for printing the pel, is modulated (i.e., reduced).

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

For example, the Print Quality Enhancement Logic 107 and the LUT 109 of the present invention may be implemented in a multitude of devices. For example, the Print Quality Enhancement Logic 107 and LUT 109 may be implemented as an Application Specific Integrated Circuit (ASIC) or a Digital Signal Processor. In addition, the Print Quality Enhancement Logic 107 and/or the LUT 109 could also be implemented as a combination of hardware/firmware and/or software stored on a ROM, RAM, EPROM, EEPROM, magnet or optical cards, or any type of media/machine-readable medium suitable for storing electronic instructions.

What is claimed is:

1. A method for generating an output of data, said method comprising:

receiving data representing a center pel and a set of neighboring pels;

comparing said center pel and the set of neighboring pels to a set of predetermined pel patterns, said predetermined pel patterns only having a center pel of a first color selected from at least two separate colors;

in response to a match between said center pel, said set of neighboring pels and a predetermined pel pattern, adjusting the size of the center pel by modulating an output of said center pel.

2. The method of claim 1, wherein said method is implemented on an electrophotographic printer.

3. The method of claim 2, wherein said adjusting the size of the center pel by modulating an output of said center pel, includes modulating a power level of a laser in said electrophotographic printer.

4. The method of claim 3, wherein each of said predetermined pel patterns has a corresponding laser power level.

5. The method of claim 4, wherein said laser power level of said electrophotographic printer is modulated using pulse-width-modulation.

6. The method of claim 4, wherein a laser power level of said wherein said laser power level of said electrophotographic printer is modulated using amplitude modulation.

7. The method of claim 1, wherein said predetermined pel patterns only include a center pel having a black color.

8. The method of claim 1, wherein said comparing center pel and the set of neighboring pels to a set of predetermined pel patterns comprises comparing said center pel to a center pel of each of the set of predetermined pel patterns and comparing a square array of pels surrounding the center pel to corresponding square pel patterns of the set of predetermined pel patterns.

9. A printing device comprising:
a first unit to receive data representing a center pel and a set of neighboring pels;
a second unit coupled to said first unit, said second unit compares said center pel and said set of neighboring pels to a set of predetermined pel patterns, said predetermined pel patterns only having a center pel of a first color selected from at least two separate colors; and
said second unit, in response to a match between said center pel and said set of neighboring pels, and a predetermined pel patter, modulates an output of said center pel thereby adjusting the size of the first center pel to compensate for overboldness.

10. The printing device of claim 9, wherein said printing device is an electrophotographic printer.

11. The printing device of claim 10, wherein said second unit modulates the output of said center pel by modulating a power level of a laser in said electrophotographic printer.

12. The printing device of claim 11, wherein each of said predetermined pel patterns has a corresponding laser power level.

13. The printing device of claim 12, wherein said laser power level of said electrophotographic printer is modulated using pulse-width-modulation.

14. The printing device of claim 12, wherein said laser power level of said electrophotographic printer is modulated using amplitude modulation.

15. The printing device of claim 9, wherein said predetermined pel patterns only include a center pel having a black color.

16. The printing device of claim 9, wherein said second unit compares said center pel to a center pel of each of the set of predetermined pel patterns and compares a square array of pels surrounding the center pel to corresponding square pel patterns of the set of predetermined pel patterns.

17. A machine readable medium having stored thereon a set of instructions for generating an output of data, said set of instructions when executed by a processor, will cause said processor to perform a method comprising:

receiving data representing a center pel and a set of neighboring pels;
comparing said center pel and set of neighboring pels to a set of predetermined pel patterns, said predetermined pel patterns only having a center pel of a first color selected from at least two separate colors;
in response to a match between said center pel and said set of neighboring pels and a predetermined pel pattern, modulating the size of said center pel to control overboldness of a printed image containing the first center pel and the set of neighboring pels.

18. The machine-readable medium of claim 17, wherein said method is implemented on an electrophotographic printer.

19. The machine-readable medium of claim 17, wherein said step of modulating an output of said center pel, includes modulating a power level of a laser in said electrophotographic printer.

20. The machine-readable medium of claim 19, wherein each of said predetermined pel patterns has a corresponding laser power level.

21. The machine-readable medium of claim 20, wherein said laser power level of said electrophotographic printer is modulated using pulse-width-modulation.

22. The machine-readable medium of claim 20, wherein a laser power level of said wherein said laser power level of said electrophotographic printer is modulated using amplitude modulation.

23. The machine-readable medium of claim 17, wherein said predetermined pel patterns only provides a center pel having a black color.

24. The machine readable medium of claim 17, wherein said comparing center pel and the set of neighboring pels to a set of predetermined pel patterns comprises comparing said center pel to a center pel of each of the set of predetermined pel patterns and comparing a square array of pels surrounding the center pel to corresponding square pel patterns of the set of predetermined pel patterns.

* * * * *